United States Patent
Bang

(10) Patent No.: US 7,388,191 B2
(45) Date of Patent: Jun. 17, 2008

(54) MIRROR POSITIONING UNIT OF LASER SCANNING UNIT AND LASER SCANNING UNIT EMPLOYING THE SAME

(75) Inventor: Doo-jin Bang, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 154 days.

(21) Appl. No.: 11/485,356

(22) Filed: Jul. 13, 2006

(65) Prior Publication Data

US 2007/0034790 A1 Feb. 15, 2007

(30) Foreign Application Priority Data

Aug. 11, 2005 (KR) .................. 10-2005-0073818

(51) Int. Cl.
- H01J 3/14 (2006.01)
- H01J 5/16 (2006.01)
- H01J 40/14 (2006.01)

(52) U.S. Cl. .................. 250/234; 250/216; 359/212; 359/223; 347/138; 347/152; 347/257

(58) Field of Classification Search ............... 250/216, 250/234, 235, 236, 239, 208.1; 399/107, 399/110, 118, 177, 220, 221; 359/196, 201, 359/212, 216, 223, 224, 225, 226; 358/481, 358/483; 347/134, 138, 152, 153, 231, 242, 347/245, 257, 263

See application file for complete search history.

(56) References Cited

U.S. PATENT DOCUMENTS 6,934,014 B1 * 8/2005 Kleinhuber .................. 356/72

FOREIGN PATENT DOCUMENTS

| JP | 09-141924 | 6/1997 |
|----|-----------|--------|
| JP | 11-352427 | 12/1999 |
| JP | 2001-356259 | 12/2001 |
| JP | 2003-098460 | 4/2003 |
| KR | 1995-0011145 | 5/1995 |
| KR | 1020000039255 | 7/2000 |

* cited by examiner

Primary Examiner—Georgia Y. Epps
Assistant Examiner—Francis M LeGasse, Jr.
(74) Attorney, Agent, or Firm—Roylance, Abrams, Berdo & Goodman, L.L.P

(57) ABSTRACT

A mirror positioning structure of a reflection mirror for correcting skew and bow and a laser scanning unit employing the same are provided. The mirror positioning structure includes a mirror holder, a fixing member, and a positioning cap. The mirror holder has a reflection mirror on one side and a guide bar disposed on the other side. The fixing member has a guide hole through which the guide bar passes, and the mirror holder is fixed on one surface of the fixing member. The positioning cap is disposed on the other surface of the fixing member and contacts the guide bar. The position cap has an inclined surface for contacting the guide bar to move the guide bar up and down inside the guide hole.

21 Claims, 10 Drawing Sheets

MIRROR POSITIONING UNIT OF LASER SCANNING UNIT AND LASER SCANNING UNIT EMPLOYING THE SAME

CROSS-REFERENCE TO RELATED PATENT APPLICATION

This application claims the benefit under 35 U.S.C. §119(a) of Korean Patent Application No. 10-2005-0073818, filed on Aug. 11, 2005, in the Korean Intellectual Property Office, the entire disclosure of which is hereby incorporated by reference.

BACKGROUND OF THE INVENTION

1. Field of the Invention

The present invention relates to a mirror positioning structure for correcting skew and bow in a laser scanning unit and a laser scanning unit employing the same. More particularly, the present invention relates to a mirror positioning structure of a laser scanning unit and a laser scanning unit employing the same, in which a reflection mirror for correcting skew or bow can be easily rotated or moved in a straight line.

2. Description of the Related Art

In general, a laser printer is a printing device which scans laser light emitted from a laser diode onto a photoconductor to form a latent image, and transfers the latent image formed on the photoconductor onto a printing medium such as paper to produce a visual image. A laser scanning unit (LSU) is an image forming device which generates laser light in such a laser printer to form a latent image on a photoconductor. FIG. 1 is a schematic view of a conventional LSU 100. Referring to FIG. 1, the LSU 100 includes a light source 111, a collimating lens 112, an aperture 113, a cylindrical lens 114, a beam deflection mirror 115, a scanning lens 116, and a photoconductive drum 118. The light source 111, the collimating lens 112, the aperture 113, the cylindrical lens 225, the beam deflection mirror 115, and the scanning lens 116 are installed in a housing to protect them from dust generated inside the printer.

In such a configuration, a light beam emitted from the light source 111, such as a laser diode, is converted into a parallel beam. The parallel beam is restricted by the aperture 113, and passes through the cylindrical lens 114 to be converged into a linear light beam that extends horizontally in a sub-scanning direction. Then, the linear light beam is moved with a uniform speed in a main scanning direction, that is, the horizontal direction of the paper, by the beam deflection mirror 115, which rotates and passes through the scanning lens 116 and is reflected by a reflection mirror 117 (see FIG. 4) onto the photoconductive drum 118. The beam deflection mirror 115 can be a polygon mirror, for example. Further, the scanning lens 116 has a uniform refractive index with respect to the axis of the light and refracts the light beam reflected from the beam deflection mirror 115 at a uniform speed along a main scanning direction to focus the light on the photoconductive drum 118.

The light beam which passes through the scanning lens 116 in the LSU 100 must be scanned in a straight line along the main scanning direction onto a surface to be scanned, such as the photoconductive drum 118. However, referring to FIG. 2, the light beam deviates minutely in the sub-scanning direction due to assembly tolerances or other aberrations. Thus, the light beam is not scanned in a straight line in main scanning direction on the surface to be scanned. When the ends A and B of the scanning line formed by the beam spot deviate along the sub-scanning direction, the scanning path is skewed. When the scanning line is not straight but instead is bent, the scanning path is bowed.

Distortions in the scanning line such as skew or bow decrease the printing precision and image quality. In a tandem laser scanning unit used in a color laser printer, skew or bow are major problems. In a color laser printer using a tandem laser scanning unit, photoconductive drums for colors such as magenta, yellow, cyan, and black are separately installed, and when different distortions of scanning lines occur on the photoconductive drums, the quality of the produced color images deteriorates.

Conventionally, scanning line distortion is corrected by directly transforming the scanning lens or the reflection mirror, or by placing a reflection mirror between the scanning lens and the photoconductive drum to adjust the angle of the laser beam.

FIG. 3 illustrates a conventional correction apparatus for correcting scanning line distortion. The conventional correction apparatus of FIG. 3 fixes the scanning lens 116 to the housing 110 using two supporting members 131, and presses the scanning lens 116 using a screw 130 which is movably installed on the housing 110. Also, protrusions 131a are formed at an end of each of the supporting members 131. The conventional correction apparatus of FIG. 3 presses the scanning lens 116 using the screw 130 and the supporting members 131 and transforms the scanning lens 116 to correct the scanning line.

FIG. 4 illustrates a conventional structure in which scanning line distortion is corrected by adjusting the inclination of the reflection mirror 117. Referring to FIG. 4, a groove 125 is formed in the housing 110, and the reflection mirror 117 is inserted in the groove 125 so that it is inclined. A screw 122 is installed in a position on the frame 110 corresponding to the upper portion of the reflection mirror 117. A fixing spring 120 and a screw 121 fix the reflection mirror 117 in the groove 125. In such a configuration, the angle of the reflection mirror 117 is adjusted by rotating the screw 122 to adjust the insertion depth of the screw 122.

However, when the scanning lens or the reflection mirror is adjusted by force using a screw, secondary distortion can occur since stress remains in the scanning lens 116 or in the reflection mirror 117. Further, to effectively correct the scanning line distortion, not only the rotation angle of the reflection mirror between the scanning lens 116 and the photoconductive drum 118 need to be adjusted, but the incident location of the beam on the scanning lens 116 needs to be adjusted to correct the incident location of the laser beam on the scanning lens.

Accordingly, a new technique is needed to correct the scanning line distortion by adjusting the incident angle and location of the laser beam at the same time.

SUMMARY OF THE INVENTION

An aspect of the present invention is to address at least the above problems and/or disadvantages and to provide at least the advantages described below. Accordingly, an aspect of the present invention is to provide a mirror positioning structure which can correct the incident angle and the incident location of a laser beam and a laser scanning unit employing the same.

Another aspect of the present invention is to provide a mirror positioning structure for correcting skew and bow caused by an alignment error of the laser beam to increase the quality of a printed color image.

According to an aspect of an exemplary embodiment of the present invention, a mirror positioning structure comprises a mirror holder, a fixing member, and a positioning cap. The mirror holder has a reflection mirror on one side and a guide bar disposed on the other side. The fixing member has a guide hole through which the guide bar passes, and the mirror holder is fixed on one surface of the fixing member. The positioning cap is disposed on the other surface of the fixing member and contacts the guide bar. The position cap has an inclined surface for contacting the guide bar to move the guide bar up and down inside the guide hole.

The guide bar may be longer horizontally or vertically such that the mirror holder rotates together with the fixing member.

The guide bar may be elastically biased in a direction opposite to a direction in which the guide bar moves when the positioning cap moves toward the fixing member.

The mirror positioning structure may further comprise a torsion spring installed on the other surface of the fixing member, and the guide bar may be elastically biased by the torsion spring.

The positioning cap may be moved by the rotation of a screw which passes through the positioning cap to be bonded with the other surface of the fixing member.

The positioning cap may be pressurized in opposite direction by a coil spring installed between the positioning cap and the fixing member.

The guide grooves may be formed on both sides of the positioning cap and protrusion portions may be formed at positions of the fixing member corresponding to the guide grooves of the positioning cap to allow the positioning cap to safely slide inside the fixing member.

An accommodating space to accommodate the mirror holder may be formed on one side of the fixing member, and an accommodating space to accommodate the positioning cap may be formed on the other side of the fixing member.

According to another aspect of an exemplary embodiment of the present invention, a laser scanning unit comprises a light source for generating light, a beam deflection mirror for deflecting the light in a main scanning direction, a scanning lens for focusing the light, a photoconductor for forming an electrostatic latent image, a reflection mirror disposed along the light path between the light source and the photoconductor to correct skew and bow, and a mirror positioning structure for adjusting the location and angle of the reflection mirror. The mirror positioning structure comprises a mirror holder, a fixing member, and a positioning cap. The mirror holder has a reflection mirror on one side and a guide bar disposed on the other side. The fixing member has a guide hole through which the guide bar passes, and the mirror holder is fixed on one surface of the fixing member. The positioning cap is disposed on the other surface of the fixing member and contacts the guide bar. The position cap has an inclined surface for contacting the guide bar to move the guide bar up and down inside the guide hole.

According to the exemplary embodiments of the present invention, since the reflection mirror positioning structure is disposed between the beam deflecting mirror and the scanning lens, the reflection mirror positioning structure can adjust the incident position and the indent angle of the light incident on the scanning lens.

The mirror positioning structure may be disposed on both sides of the reflection mirror. The mirror positioning structure may also be disposed only on one side of the reflection mirror.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the exemplary embodiments of the invention. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

Figure 1:
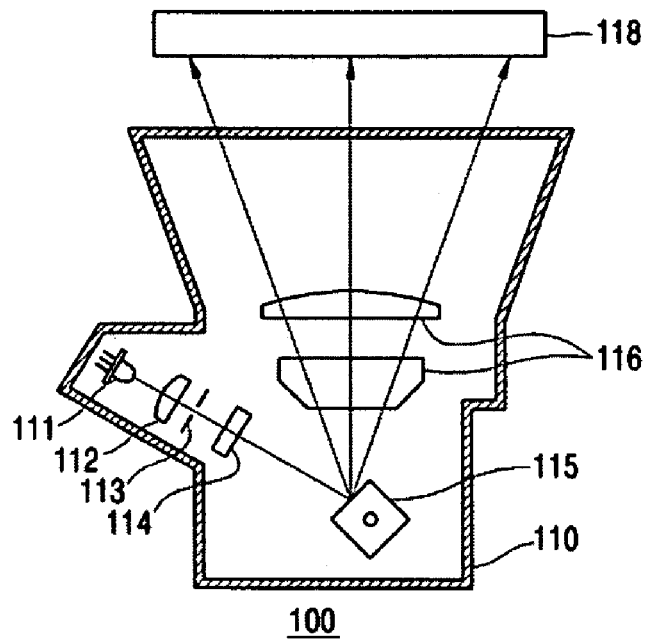
FIG. 1 is a schematic view of a conventional laser scanning unit (LSU)
Figure 2:
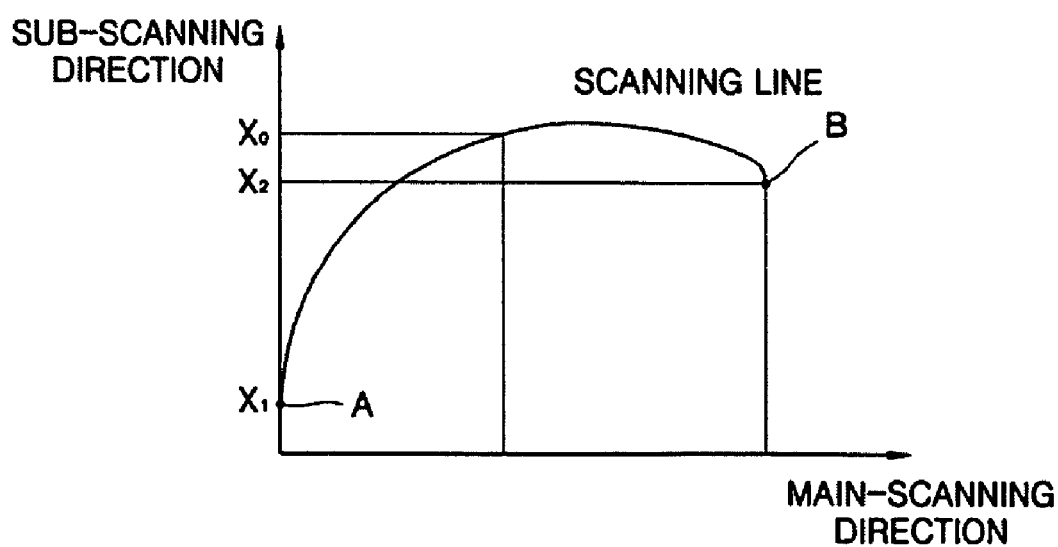
FIG. 2 is a graph illustrating scanning line distortion in an LSU.
Figure 3:
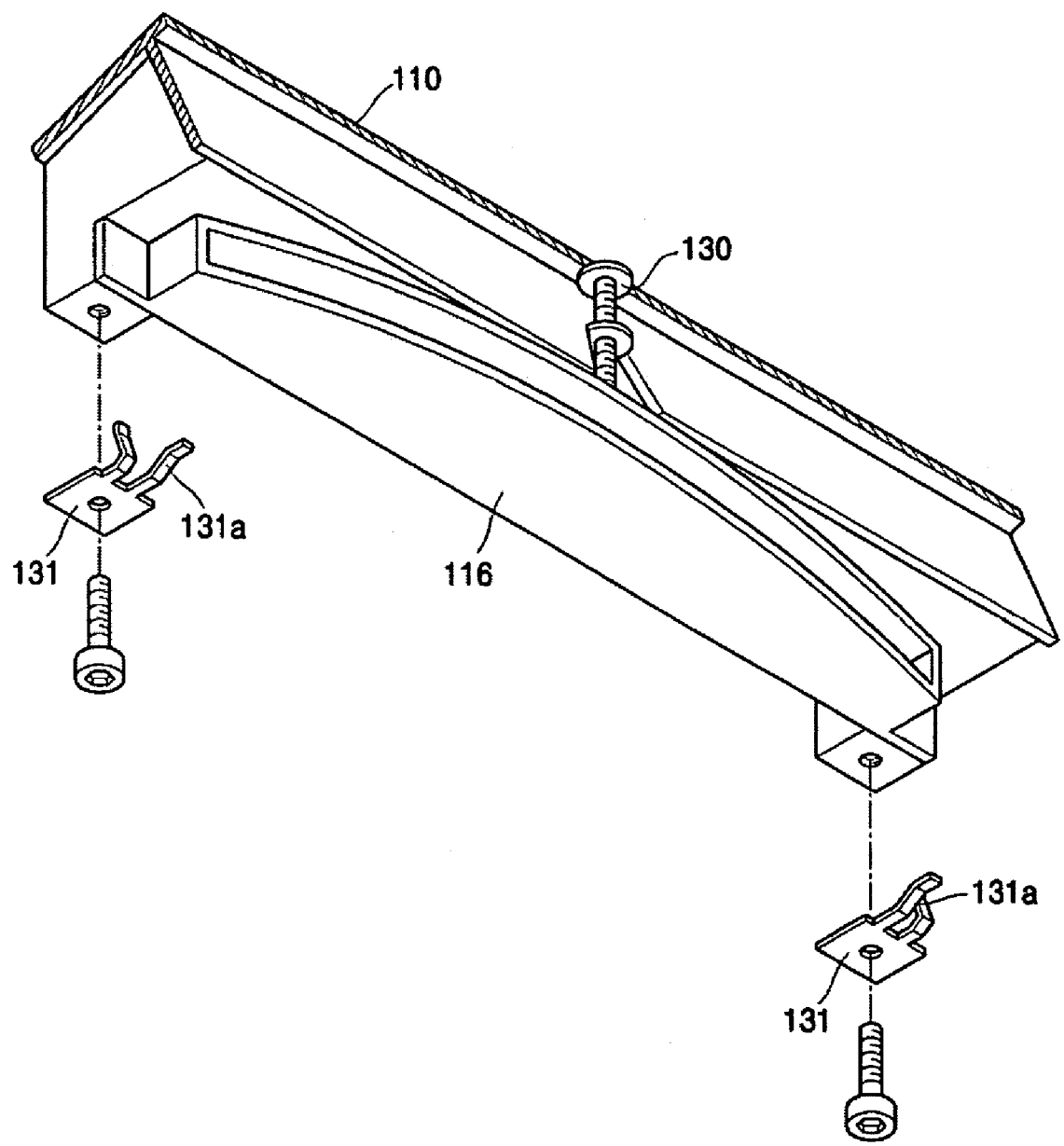
FIGS. 3 and 4 illustrate conventional correction structures for correcting scanning line distortion.
Figure 4:
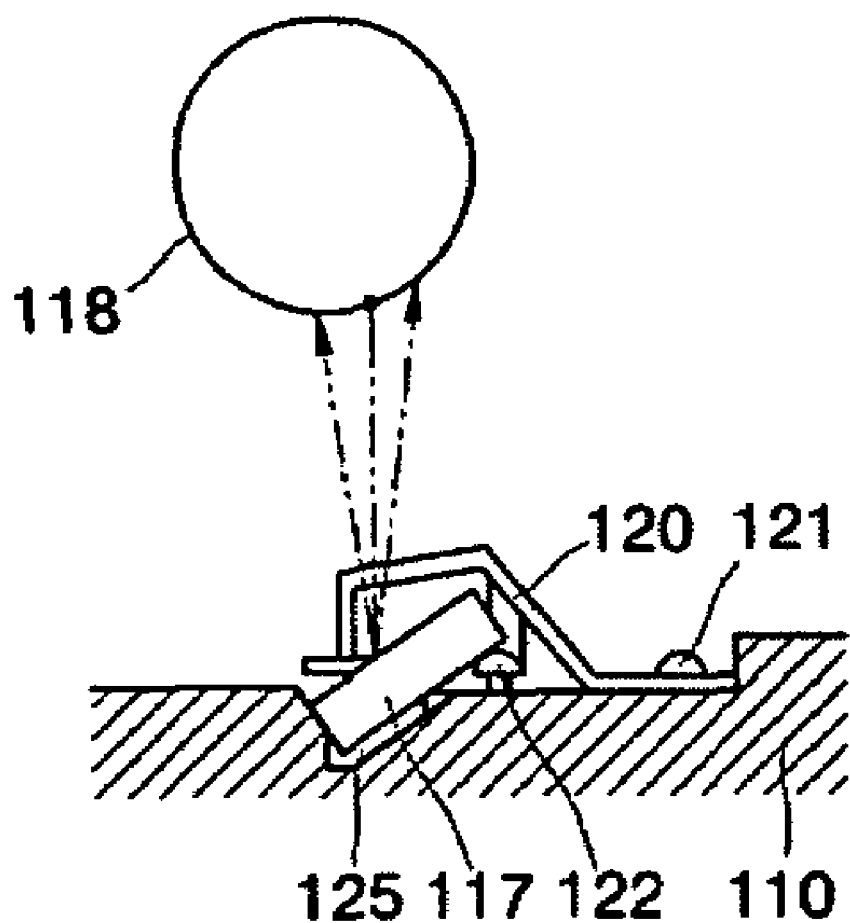
Figure 5:
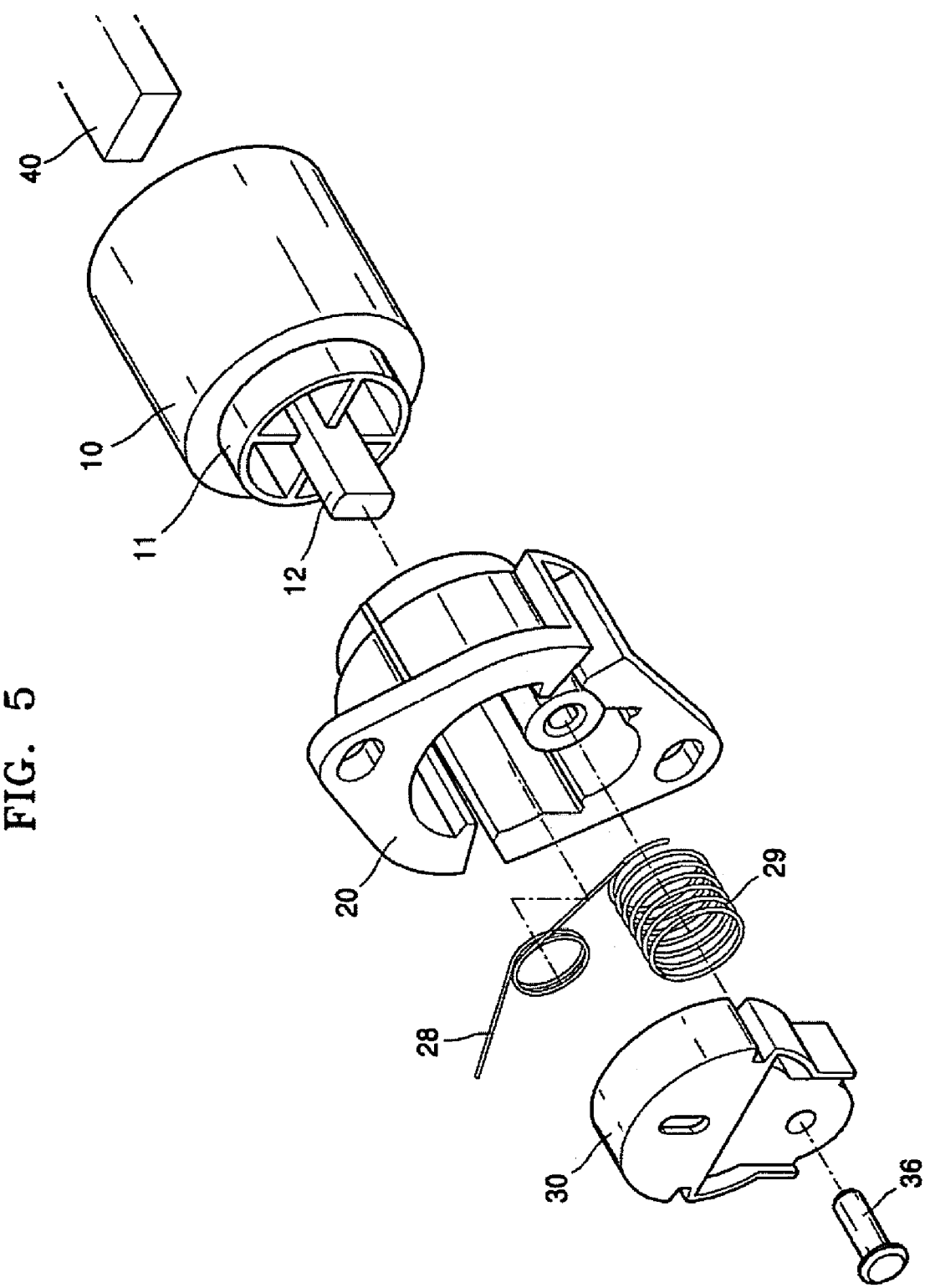
FIG. 5 is a perspective view of a mirror positioning structure according to an exemplary embodiment of the present invention.

FIG. 5 is a perspective view of a mirror positioning structure for correcting scanning line distortion according to an exemplary embodiment of the present invention. Referring to FIG. 5, the mirror positioning structure includes a mirror holder 10 in which a reflection mirror 40 is installed, a fixing member 20 coupled with the mirror holder 10 to rotate together with the mirror holder 10, and a positioning cap 30 contained in the fixing member 20 to move the mirror holder 10 up and down. The mirror positioning structure further includes a torsion spring 28 and a coil spring 29 to elastically bias the mirror holder 10 and the positioning cap 30.

The reflection mirror 40 may be, for example, installed between a beam deflection mirror and a scanning lens of a laser scanning unit to adjust the incident location and the incident angle of the incident light on the scanning lens to correct skew and bow. The mirror holder 10 holds the reflection mirror 40, and is rotated and moved up and down by the fixing member 20 and the positioning cap 30 to rotate and move the reflection mirror 40. To allow this, though not shown in the drawing, a hole in which the reflection mirror 40 is inserted is formed in one side of the mirror holder 10. A guide bar 12 protrudes from the other side of the mirror holder 10 and passes through the fixing member 20 to contact the positioning cap 30. Further, an insertion portion 11 can be formed on the mirror holder with a smaller circumference than the mirror holder 10 to safely contain the mirror holder 10 in the containing unit 27 (refer to FIG. 6B) of the fixing unit 20. Here, the guide bar 12 protrudes from the center of the insertion portion 11.

Figure 6A:
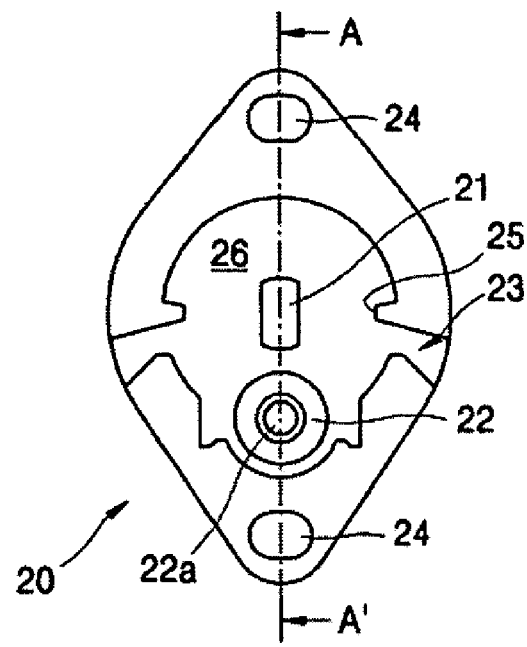
FIGS. 6A and 6B are a front view and a cross-sectional view of the fixing member of the mirror positioning structure of FIG. 5.
Figure 6B:
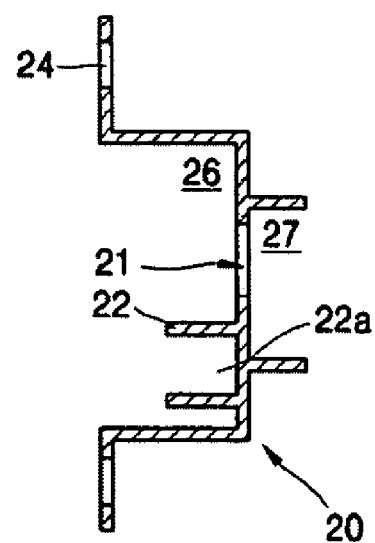

FIG. 6A is a front view of the fixing member 20, and FIG. 6B is a cross-sectional view of the fixing member along line A-A'. Referring to FIGS. 6A and 6B, a guide hole 21, which is a slot hole through which the guide bar 12 of the mirror holder 10 passes, is formed near the center of the fixing member 20. When inserted into the guide hole 21, the guide bar 12 can move up and down in the guide hole 21. To allow this, the height of the guide hole 21 is greater than that of the guide bar 12. Since the guide hole 21 and the guide bar 12 have smaller widths than heights, the guide bar 12 and the mirror holder 10 rotate together with the fixing member 20.

A screw accommodation portion 22 protrudes from the lower portion of the guide hole 21, and a screw hole 22*a* in which a positioning screw 36 (refer to FIG. 5) is to be contained is formed in the center of the screw accommodation portion 22. Further, fixing holes 24 are formed in the upper and lower portions of the fixing member 20. For example, the fixing member 20 can be fixed in the laser scanning unit by bonding a screw with the housing of the laser scanning unit through the fixing hole 24. As shown in FIG. 6A, the fixing hole 24 extends horizontally, and thus the fixing member 20 can rotate within the horizontal range of the fixing hole 24. Further, a groove 23 into which the torsion spring 28 is to be fixed and a protrusion portion 25 on which the positioning cap 30 may be slid is formed on each side of the fixing member 20. The torsion spring 28 and the positioning cap 30 will be described in more detail later. Also, as shown in FIG. 6B, accommodation portions 26 and 27 are formed on both surfaces of the fixing member 20 to contain the positioning cap 30 and the mirror holder 10, respectively.

Figure 7A:
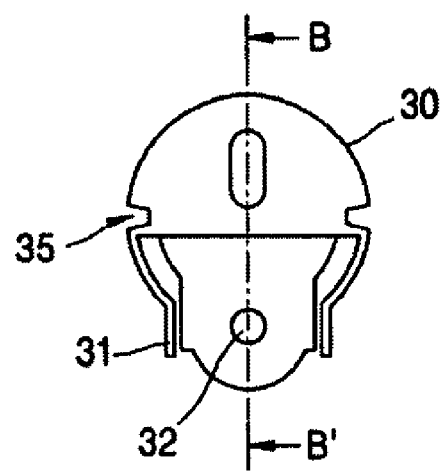
FIGS. 7A and 7B are a front view and a cross-sectional view of the positioning cap of the mirror positioning structure of FIG. 5.
Figure 7B:
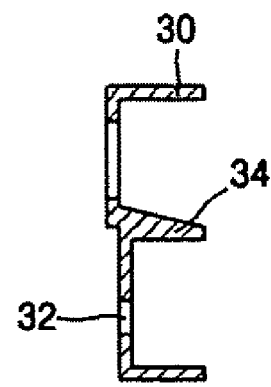

FIG. 7A is a front view of the positioning cap 30, and FIG. 7B is a cross-sectional view along line B-B' of the positioning cap 30. Referring to FIGS. 7A and 7B, an elastic pin 31 is formed on both sides of the lower portion of the positioning cap 30, and when the positioning cap 30 is contained in the fixing member 20, the elastic pins 31 pressurize the inner walls of the accommodation portion 26 of the fixing member 20 to fix the positioning cap 30 without being shaken in the fixing member 20. Further, a hole 32 through which the positioning screw 36 passes is formed in the lower portion of the positioning cap 30. A guide groove 35 is formed on each side of the positioning cap 30. The guide grooves 35 engage the protrusions 25 of both ends of the fixing member 20 to allow the positioning cap 30 to slide in the fixing member 20. Referring to FIG. 7B, an inclined surface 34 is formed in an area of the positioning cap 30 for contacting the guide bar 12 of the mirror holder 10. The guide bar 12 is pushed upward by the inclined surface 34 as the positioning cap 30 is moved inside the fixing member 20.

Figure 8A:
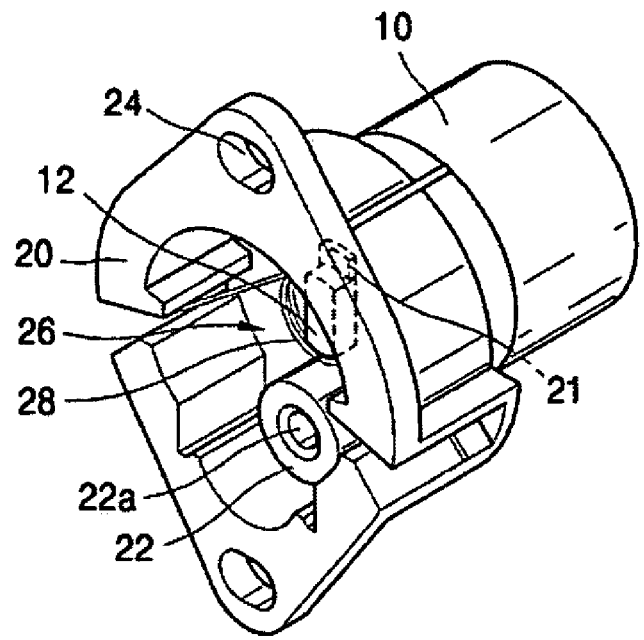
FIGS. 8A and 8B are a perspective view and a front view of the reflection mirror holder of the mirror positioning structure of FIG. 5 and the fixing member of FIGS. 6A and 6B in combination.
Figure 8B:
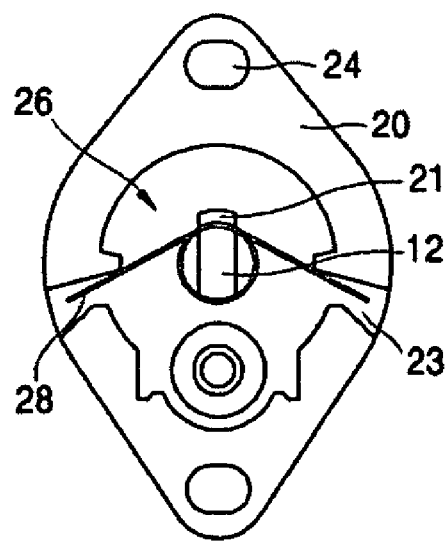

FIGS. 8A and 8B are a perspective view and a front view of the mirror holder 10 and the fixing member 20 coupled together. Referring to FIGS. 8A and 8B, the mirror holder 10 is accommodated by the accommodation portion 27 of the fixing member 20. Here, the guide bar 12 of the mirror holder 10 passes through the guide hole 21 of the fixing member 20. As shown in FIGS. 8A and 8B, a torsion spring 28 is installed inside the fixing member 20 to elastically bias the guide bar 12. Specifically, the main portion of the torsion spring 28 surrounds the guide bar 12 in the fixing member 20, and the ends of the torsion spring 28 are fixed in grooves 23 in both sides of the fixing member 20. The guide bar 12 is pushed downward by the elastic force of the torsion spring 28. Accordingly, when the positioning cap 30 is moved forward, the guide bar 12 is lifted, and when the positioning cap 30 is retracted, the guide bar 12 is moved downward by the elastic force.

Figure 9A:
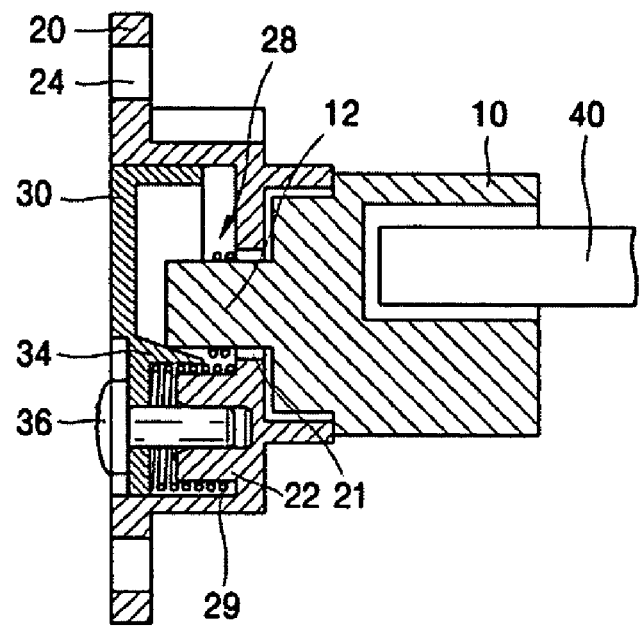
FIGS. 9A through 9C are cross-sectional views illustrating the operation of the mirror positioning structure of FIG. 5.
Figure 9B:
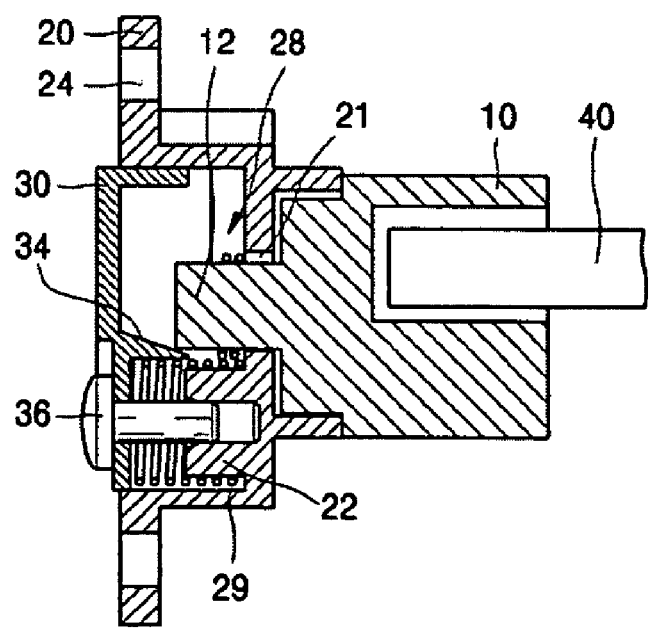
Figure 9C:
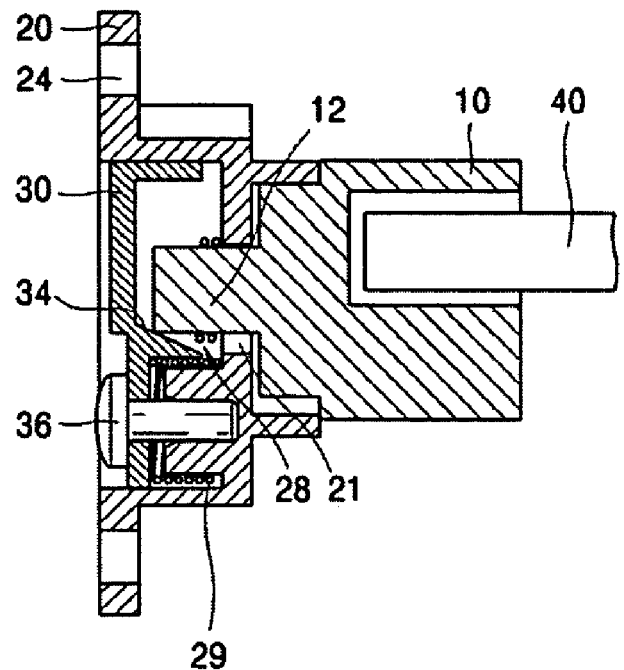

FIGS. 9A through 9C are cross-sectional views illustrating the operation of the mirror positioning structure according to an exemplary embodiment structure of the present invention. Referring to FIG. 9A, the mirror holder 10 and the positioning cap 30 are respectively contained in both surfaces of the fixing member 20, and the guide bar 12 of the mirror holder 10 contacts the inclined surface 34 of the positioning cap 30. A positioning screw 36 passes through the hole 32 of the positioning cap 30 to be inserted into the screw hole 22*a* of the fixing member 20, and thus the positioning cap 30 can be fixed in the fixing member 20. Further, a coil spring 29 is installed around the screw accommodation unit 22 of the fixing member 20 such that the positioning cap 30 is pushed outward from the fixing member 20.

In such a configuration, the depth to which the positioning cap 30 enters the fixing member 20 is adjusted by rotating the positioning screw 36. For example, referring to FIG. 9B, when the positioning screw 36 is loosened, the positioning cap 30 retracts from the fixing member 20 by the distance the positioning screw 36 is moved due to the elastic force of the coil spring 29. Then, the guide bar 12 is moved to the lower portion of the guide hole 21 along the inclined surface 34 due to the elastic force by elasticity of the torsion spring 28. Accordingly, the mirror holder 10 and the reflection mirror 40 fixed in the mirror holder 10 are moved downward.

Referring to FIG. 9C, when the positioning screw 36 is tightened, the positioning cap 30 moves forward into the fixing member 20. Then the guide bar 12 is pushed by the inclined surface 34 of the positioning cap 30 and moved to the upper portion of the guide hole 21. Accordingly, the mirror holder 10 and the reflection mirror 40 fixed in the mirror holder 10 are moved upward. Thus, the reflection mirror 40 can be moved up and down by loosening or fastening the positioning screw 36.

Correction of skew and bow in a laser scanning unit using the mirror positioning structure according to an exemplary embodiment of the present invention will now be described. When a light beam is minutely deviated due to assembly tolerances or aberrations, skew and bow can occur. In the current exemplary embodiment of a mirror positioning structure, the rotation angle and the location of the reflection mirror can be independently adjusted to correct skew and bow.

Figure 10:
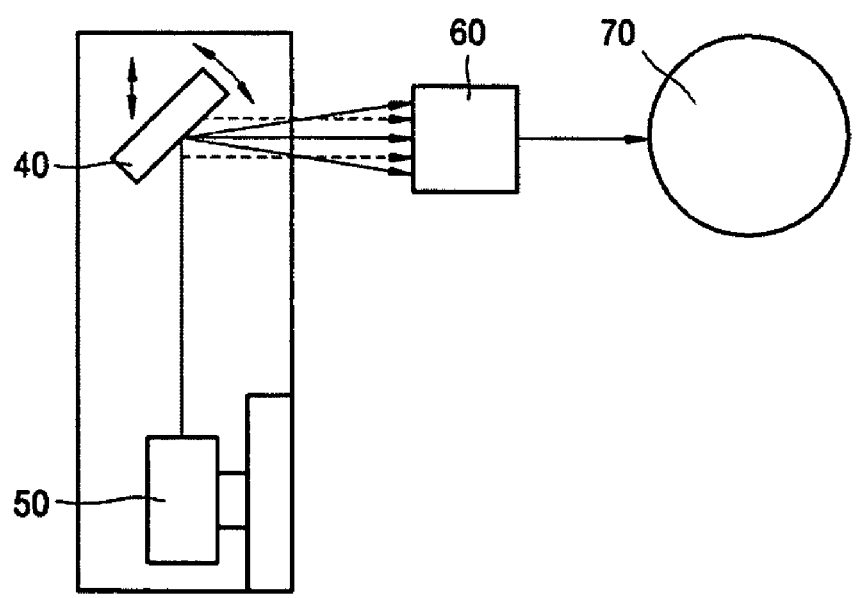
FIG. 10 illustrates the operation of the mirror positioning structure of FIG. 5 installed in the laser scanning unit according to an exemplary embodiment of the present invention.
Figure 11A:
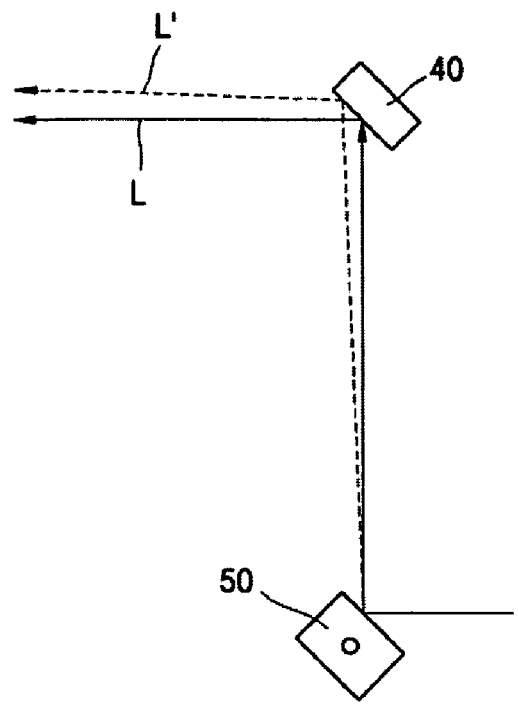
FIGS. 11A and 11B are schematic views illustrating the correction of scanning line distortion by rotating and positioning a reflection mirror.
Figure 11B:
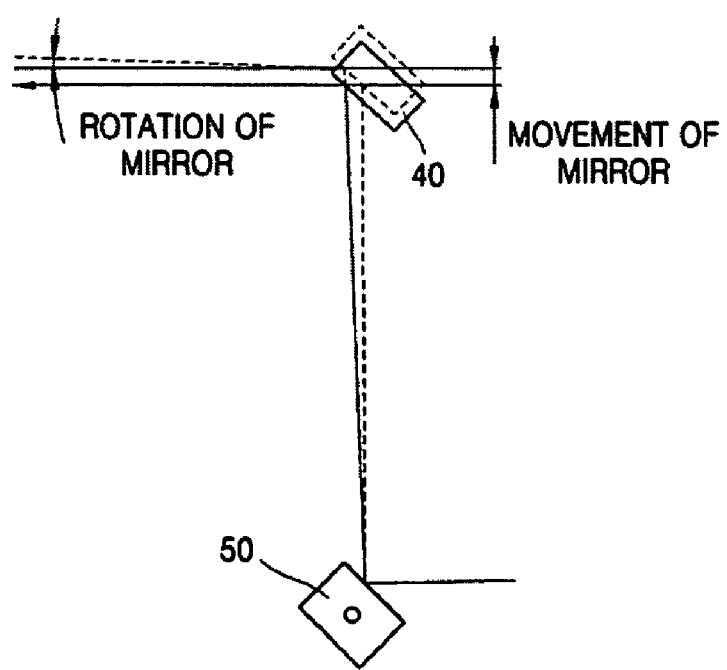

FIG. 10 is a schematic view illustrating the operation of the mirror positioning structure of the reflection mirror installed in a laser scanning unit according to an exemplary embodiment of the present invention, in which the reflection mirror 40 is placed between a beam deflection mirror 50 and a scanning lens 60. FIGS. 11A and 11B are schematic views illustrating the correction of scanning line distortion by rotating and positioning a reflection mirror. As shown in FIG. 11A, a scanning line L' is assumed to deviate from a normal scanning line L reflected from the beam deflection mirror 50. Variation of the location of the laser beam is observed in the mirror positioning structure in the housing (not shown), and the reflection mirror 40 is rotated by rotating the fixing member 20 by using an instrument or by manual adjustment. As described above, the fixing holes 24, which are slots, are formed in the upper and lower portions of the fixing member 20 and thus, the fixing member 20 can rotate within a certain angular range. Referring to FIG. 11B, when the laser beam is adjusted to be horizontally incident on the scanning lens 60, the fixing member 20 is completely fixed inside the housing of the laser scanning unit using a screw.

Then, while observing the variation of the laser beam, the positioning screw 36 is loosened or fastened, causing the positioning cap 30 to move back and forth and the reflection mirror 40 to move up and down. Accordingly, as shown in FIG. 11B, the laser beam is adjusted to be incident on the central axis of the scanning lens 60. The laser beam is incident on the central axis of the scanning lens 60 after reflecting from the reflection mirror 40, by which the skew and the bow are corrected, and is incident on the photoconductive drum 70.

According to a further aspect of the present invention, the laser scanning unit can include a mirror positioning structure installed on both sides of the reflection mirror 40 to adjust the angle and location of the reflection mirror 40 from both sides of the reflection mirror 40. According to another aspect of the present invention, the laser scanning unit can include a mirror positioning structure installed on one side of the reflection mirror 40 and a mirror holder on the other side.

As described above, the angle and the location of the reflection mirror correcting skew and bow can be independently adjusted by the mirror positioning structure of the exemplary embodiments of the present invention. Accordingly, distortions such as skews and bows in the scanning line that occur due to alignment errors of a laser beam in a tandem laser scanning unit in a color laser printer, for example, which cannot be corrected by circuitry, can be corrected manually, thereby improving the quality of a printed color image.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A mirror positioning structure comprising:
   a mirror holder having a reflection mirror on one side and a guide bar on the other side;
   a fixing member having a guide hole for accommodating the guide bar, the fixing member having first and second sides, the mirror holder being disposed on the first side of the fixing member; and
   a positioning cap disposed on the second side of the fixing member, the positioning cap having an inclined surface for contacting the guide bar to move the guide bar up and down inside the guide hole.

2. The mirror positioning structure of claim 1, wherein the guide bar is configured so that the mirror holder rotates together with the fixing member.

3. The mirror positioning structure of claim 1, wherein the guide bar is elastically biased in a direction opposite to a direction in which the guide bar moves when the positioning cap moves toward the fixing member.

4. The mirror positioning structure of claim 3, further comprising a torsion spring disposed on the fixing member for elastically biasing the guide bar.

5. The mirror positioning structure of claim 3, further comprising a screw passing through the positioning cap and into the fixing member, the positioning cap being moved by rotation of the screw.

6. The mirror positioning structure of claim 5, further comprising a coil spring disposed between the positioning cap and the fixing member.

7. The mirror positioning structure of claim 5, further comprising at least one guide groove disposed on the positioning cap and at least one protrusion portion disposed on a corresponding location of the fixing member for allowing the positioning cap to slide inside the fixing member.

8. The mirror positioning structure of claim 3, further comprising an accommodating space for accommodating the mirror holder on the fixing member, and an accommodating space for accommodating the positioning cap on the other side of the fixing member.

9. A laser scanning unit comprising:
   a light source for generating light;
   a beam deflection mirror for deflecting the light in a main scanning direction;
   a scanning lens focusing the light;
   a photoconductor on which an electrostatic latent image is formed by the light;
   a reflection mirror disposed along the light path between the light source and the photoconductor to correct skew and bow; and
   a mirror positioning structure adjusting the location and angle of the reflection mirror, the mirror positioning structure comprising:
      a mirror holder having a reflection mirror on one side and a guide bar on the other side;
      a fixing member having a guide hole for accommodating the guide bar, the fixing member having first and second sides, the mirror holder being disposed on the first side of the fixing member; and
      a positioning cap disposed on the second side of the fixing member, the positioning cap having an inclined surface for contacting the guide bar to move the guide bar up and down inside the guide hole.

10. The laser scanning unit of claim 9, wherein the guide bar is configured so that the mirror holder rotates together with the fixing member.

11. The laser scanning unit of claim 9, wherein the guide bar is elastically biased in a direction opposite to a direction in which the guide bar moves when the positioning cap moves toward the fixing member.

12. The laser scanning unit of claim 11, further comprising a torsion spring disposed on the fixing member for elastically biasing the guide bar.

13. The laser scanning unit of claim 11, further comprising a screw passing through the positioning cap and into the fixing member, the positioning cap being moved by rotation of the screw.

14. The laser scanning unit of claim 13, further comprising a coil spring disposed between the positioning cap and the fixing member.

15. The laser scanning unit of claim 13, further comprising at least one guide groove disposed on the positioning cap and at least one protrusion portion disposed on a corresponding location of the fixing member for allowing the positioning cap to slide inside the fixing member.

16. The laser scanning unit of claim 11, further comprising an accommodating space for accommodating the mirror holder on the fixing member, and an accommodating space for accommodating the positioning cap on the other side of the fixing member.

17. The laser scanning unit of claim 11, wherein the reflection mirror is disposed between the beam deflection mirror and the scanning lens to adjust the incident location and the incident angle of the incident light on the scanning lens.

18. The laser scanning unit of claim 11, wherein the reflection mirror is disposed between the scanning lens and the photoconductor to adjust the incident location and the incident angle of the incident light on the photoconductor.

19. The laser scanning unit of claim 11, wherein the mirror positioning structure is installed on both sides of the reflection mirror.

20. The laser scanning unit of claim 11, wherein the mirror positioning structure is installed on one side of the reflection mirror.

21. An image forming apparatus comprising the laser scanning unit of claim 9, wherein the image forming apparatus transfers a latent image formed on a photoconductor by the laser scanning unit onto a printing medium.

* * * * *